(12) United States Patent
Corbett et al.

(10) Patent No.: US 8,032,704 B1
(45) Date of Patent: *Oct. 4, 2011

(54) DATA PLACEMENT TECHNIQUE FOR STRIPING DATA CONTAINERS ACROSS VOLUMES OF A STORAGE SYSTEM CLUSTER

(75) Inventors: Peter F. Corbett, Lexington, MA (US); Robert M. English, Menlo Park, CA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/533,633

(22) Filed: Jul. 31, 2009

Related U.S. Application Data

(63) Continuation of application No. 12/109,272, filed on Apr. 24, 2008, now Pat. No. 7,647,451, which is a continuation of application No. 11/118,298, filed on Apr. 29, 2005, now Pat. No. 7,366,837, which is a continuation-in-part of application No. 10/720,364, filed on Nov. 24, 2003, now Pat. No. 7,185,144.

(51) Int. Cl.
*G06F 12/00* (2006.01)
*G06F 15/16* (2006.01)
(52) U.S. Cl. ............ 711/114; 711/7; 711/170; 709/201; 709/203
(58) Field of Classification Search ............. 711/7, 114, 711/170; 709/201, 203
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |

(Continued)

FOREIGN PATENT DOCUMENTS

EP  1 324 200 A2  7/2003
(Continued)

OTHER PUBLICATIONS

Hartman et al., "The Zebra Striped Network File System", published Aug. 1995 ACM 0734-2071/95/0800-0274, pp. 274-310.

(Continued)

*Primary Examiner* — Kevin Ellis
*Assistant Examiner* — Mehdi Namazi
(74) *Attorney, Agent, or Firm* — Cesari and McKenna, LLP

(57) ABSTRACT

A method and apparatus for storing data on a computer data storage system are described. Two or more computers are coupled together to form a cluster of computers. One or more data storage devices are coupled to the two or more computers. One or more volumes of data storage devices are implemented on a plurality of computers of the two or more computers, where each volume is a logical arrangement of the one or more storage devices coupled to a selected computer of the plurality of computers. A data container holds data stored by the data storage system. The data container is striped over a plurality of the one or more volumes of data storage devices, whereby data stored in the data container is striped over a plurality of the volumes of data storage devices.

27 Claims, 14 Drawing Sheets

U.S. PATENT DOCUMENTS

| | | |
|---|---|---|
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,271,012 A | 12/1993 | Blaum et al. |
| 5,274,799 A | 12/1993 | Brant et al. |
| 5,305,326 A | 4/1994 | Solomon et al. |
| 5,351,246 A | 9/1994 | Blaum et al. |
| 5,375,128 A | 12/1994 | Menon et al. |
| 5,410,667 A | 4/1995 | Belsan et al. |
| 5,537,567 A | 7/1996 | Galbraith et al. |
| 5,574,851 A | 11/1996 | Rathunde |
| 5,579,475 A | 11/1996 | Blaum et al. |
| 5,615,352 A | 3/1997 | Jacobson et al. |
| 5,623,595 A | 4/1997 | Bailey |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,884,098 A | 3/1999 | Mason, Jr. |
| 5,948,110 A | 9/1999 | Hitz et al. |
| 5,950,225 A | 9/1999 | Kleiman |
| 5,963,962 A | 10/1999 | Hitz et al. |
| 5,963,963 A | 10/1999 | Schmuck et al. |
| 5,991,804 A | 11/1999 | Bolosky et al. |
| 6,000,010 A | 12/1999 | Legg |
| 6,035,373 A | 3/2000 | Iwata |
| 6,038,570 A | 3/2000 | Hitz et al. |
| 6,092,215 A | 7/2000 | Hodges et al. |
| 6,138,125 A | 10/2000 | DeMoss |
| 6,138,126 A | 10/2000 | Hitz et al. |
| 6,138,201 A | 10/2000 | Rebalski |
| 6,158,017 A | 12/2000 | Han et al. |
| 6,223,300 B1 | 4/2001 | Gotoh |
| 6,247,157 B1 | 6/2001 | Edirisooriya |
| 6,289,356 B1 | 9/2001 | Hitz et al. |
| 6,502,166 B1 | 12/2002 | Cassidy |
| 6,532,548 B1 | 3/2003 | Hughes |
| 6,557,123 B1 | 4/2003 | Wiencko et al. |
| 6,564,252 B1 | 5/2003 | Hickman et al. |
| 6,571,326 B2 | 5/2003 | Spiegel et al. |
| 6,581,185 B1 | 6/2003 | Hughes |
| 6,662,268 B1 * | 12/2003 | McBrearty et al. ........... 711/114 |
| 6,671,772 B1 | 12/2003 | Cousins |
| 6,671,773 B2 | 12/2003 | Kazar et al. |
| 6,742,137 B1 | 5/2004 | Frey, Jr. |
| 6,779,095 B2 | 8/2004 | Selkirk et al. |
| 6,993,701 B2 | 1/2006 | Corbett et al. |
| 7,073,115 B2 | 7/2006 | English et al. |
| 7,159,093 B2 | 1/2007 | Dalal et al. |
| 7,185,144 B2 | 2/2007 | Corbett et al. |
| 7,203,892 B2 | 4/2007 | Corbett et al. |
| 7,263,629 B2 | 8/2007 | Corbett et al. |
| 7,328,305 B2 | 2/2008 | Kleiman et al. |
| 7,366,837 B2 | 4/2008 | Corbett et al. |
| 7,409,494 B2 | 8/2008 | Edwards et al. |
| 7,409,625 B2 | 8/2008 | Corbett et al. |
| 7,647,451 B1 | 1/2010 | Corbett et al. |
| 2002/0035668 A1 | 3/2002 | Nakano et al. |
| 2002/0083037 A1 | 6/2002 | Lewis et al. |
| 2002/0124137 A1 | 9/2002 | Ulrich et al. |
| 2003/0188045 A1 | 10/2003 | Jacobson |
| 2004/0030668 A1 | 2/2004 | Pawlowski et al. |
| 2004/0139167 A1 | 7/2004 | Edsall et al. |
| 2004/0153479 A1 | 8/2004 | Mikesell et al. |
| 2005/0114350 A1 | 5/2005 | Rose et al. |
| 2005/0192932 A1 | 9/2005 | Kazar et al. |
| 2006/0200626 A1 | 9/2006 | Gabryjelski et al. |
| 2006/0248379 A1 | 11/2006 | Jernigan |

FOREIGN PATENT DOCUMENTS

| | | |
|---|---|---|
| EP | 1343087 | 9/2003 |
| JP | 10003440 | 6/1998 |
| WO | WO 98/50858 A1 | 11/1998 |
| WO | WO 00-07101 | 2/2000 |
| WO | WO-01/13236 A1 | 2/2001 |
| WO | WO 02-29807 A2 | 3/2002 |
| WO | WO-02/29539 A2 | 4/2002 |

OTHER PUBLICATIONS

Lee et al. "Petal: Distributed Virtual Disks", 1996 ACM 0-89791-767-7/96/0010, pp. 84-92.

"Notification of Transmittal of the International Search Report and the Written Opinion of the International Searching Authority, or the Declaration", mailed on Oct. 27, 2006 for PCT/US2006/015917, 13 pages.

Hartman et al. "Zebra: A Striped Network File System", Proceedings of the Usenix File System Workshop, Apr. 28, 1992, 10 pages.

Hartman et al. "The Zebra Striped Network File System", Dec. 1, 1993, Operating Systems Review, ACM, New York, NY, US, pp. 29-43.

Simitci et al. "Adaptive Disk Striping for Parallel Input/Output", Mass Storage Systems, 1999. 16th IEEE Symposium on San Diego, CA, USA, IEEE Issn. 1051-9173/99, Mar. 15, 1999, pp. 88-102.

Shinkai et al. "HAMFS File System", Reliable Distributed Systems, 1999. Proceedings of the 18th IEEE Symposium on Lausanne, Switzerland, Oct. 19-22, 1999, pp. 190-201.

"Notification of Transmittal of the International Search Report and the Written Opinion of the International Searching Authority, or the Declaration", mailed on Jan. 13, 2006 for PCT/US2005/030889, 7 pages.

"Notification of Transmittal of the International Search Report and the Written Opinion of the International Searching Authority, or the Declaration", mailed on Nov. 9, 2006 for PCT/US2004/039618, 3 pages.

Brinkman et al., "Efficient, Distributed Data Placement Strategies for Storage Area Networks", SPAA 00: Proceedings of the 12th Annual ACM Symposium on Parallel Algorithms and Architectures, 2000, ACM Press, New York, NY, USA, 10 pages.

Anvin, Peter H, "The Mathematics of RAID 6," Dec. 2004.

Auspex 4Front NS2000, System Architecture, Network-Attached Storage for a New Millennium, Auspex Engineering Technical Report Jan. 24, 1999.

Bestavros, Azer, et al., Reliability and Performance of Parallel Disks, Technical Memorandum 45312-891206-01TM, AT&T, Bell Laboratories, Department 45312, Holmdel, NJ, Dec. 1989.

Bitton, Dina, Disk Shadowing, Proceedings of the 14th VLDB Conference, LA, CA (1988).

Blaum, Mario, et al., Evenodd: An Optimal Scheme for Tolerating Double Disk Failures in RAID Architectures, Computer Architectures News, Association for Computing Machinery, New York, US, vol. 22, No. XP000450355, Apr. 1, 1994.

Blaum, Mario, et al., Evenodd: An Efficient Scheme for Tolerating Double Disk Failures in RAID Architectures, IEEE Transactions on Computers, vol. 44, No. 2, Feb. 1995, pp. 192-202.

Bultman, David L., High Performance SCSI Using Parallel Drive Technology, In Proc. BUSCON Conf., pp. 40-44, Anaheim, CA, Feb. 1988.

Chen, Peter et al., Two Papers on RAIDs. Technical Report, CSD-88-479, Computer Science Division, Electrical Engineering and Computer Sciences, University of California at Berkeley (1988).

Chen, Peter M., et al., An Evaluation of Redundant Arrays of Disks Using an Amdahl 5890, Performance Evaluation, pp. 74-85, 1990—check to see if exact same copy as one in WAFL.

Chen, Peter M.., et al, Maximizing Performance in a Striped Disk Array, Proc. 1990 ACM SIGARCH 17th Intern. Symp. on Comp. Arch., Seattle, WA, May 1990, pp. 322-331.

Chen, Peter M., et al., RAID:High Performance, Reliable Secondary Storage, ACM Computing Surveys, 26(2):145-185, Jun. 1994.

Chervenak, Ann L., Performance Measurement of the First RAID Prototype, Technical Report UCB/CSD 90/574, Computer Science Division (EECS), University of California, Berkeley, May 1990.

Copeland, George, et al., A Comparison of High-Availability Media Recovery techniques, in Proc. ACM-SIGMOD Int. Conf. Management of Data, 1989.

Courtright II, William V., et al., RAIDframe: A Rapid Prototyping Tool for RAID Systems, Computer Science Technical Report CMU-CS97-142, Carnegie Mellon University, Pittsburgh, PA 15213, Jun. 4, 1997.

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD 88/477, Computer Science Division, University of California, (Jul. 1988).

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Goldick, Jonathan S., et al., Multi-resident AFS: An Adventure in Mass Storage, In Proceedings of the 1995 USENIX Technical Conference, pp. 47-58, Jan. 1995.

Graham, Susan L., et al., Massive Information Storage, Management, and Use, (NSF Institutional Infrastructure Proposal), Technical Report No. UCB/CSD 89/493, Jan. 1989.

Gray, Jim et al., Parity striping of disc arrays: Low-Cost Reliable Storage with Acceptable Throughput. In Proceedings of the 16th Very Large Data Bases Conference, pp. 148-161, Brisbane, Australia, 1990.

Grimes, DW Martinez, Two Dimensional Parity Error Correction Procedure, IBM Technical Disclosure Bulletin 2686-2689, Oct. 1982.

Grimes, DW Martinez, Vertical Parity Generator for Two Dimensional Parity, IBM Technical Disclosure Bulletin 2682-2685, Oct. 1982.

Hellerstein, Lisa, et al,. Coding Techniques for Handling Failures in Large Disk Arrays. In Algorithmica vol. 2, Nr. 3, 182-208 (1994).

Hitz, David, TR3002 File System Design for a NFS File Server Appliance, Network Appliance, Inc.

Hughes, James, et al., High Performance RAIT , Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, Tape Group Parity Protection, IEEE Symposium on Mass Storage, pp. 72-79, Mar. 1999.

Katz, Randy H. et al., Disk System Architectures for High Performance Computing, undated.

Kent, Jack et al., Optimizing Shadow Recovery Algorithms, IEEE Transactions on Software Engineering, 14(2):155-168, Feb. 1988.

Kim, Michelle Y., Synchronized Disk Interleaving, IEEE Transactions on Computers, C-35(11):978-988, Nov. 1986.

Kim, Michelle, et al., Asynchronous Disk Interleaving Approximating Access Delays, IEEE Transactions on Computers, vol. 40, No. 7, Jul. 1991 , pp. 801-810.

Lawlor, F. D., Efficient Mass Storage Parity Recovery Mechanism, IBM Technical Disclosure Bulletin 24(2):986-987, Jul. 1981.

Lee, Edward K., et al., RAID-II: A Scalable Storage Architecture for High-Bandwidth Network File Service, Technical Report UCB/CSD 92/672, (Feb. 1992).

Lee, Edward K., et al., The Performance of Parity Placements in Disk Arrays, IEEE Transactions on Computers, vol. 42 No. 6, Jun. 1993, 14 pages.

Li, Don, et al., Authors' Reply, IEEE Transactions on Communications, 46:575, May 1998.

Limited Distributed DASD Checksum, A RADI Hybrid, IBW Technical Disclosure Bulletin, IBM Corp. New York, US vol. 35. No. 4A, XP000314813, Sep. 1, 1992.

Livny, Miron, et al., Multi-Disk Management Algorithms, In Proceedings of the ACM International Conference on Measurement and Modeling of Computer Systems (SIGMETRICS), pp. 69-77, Banff, Alberta, Canada, May 1987.

Meador, Wes E., Disk Array Systems, Proceedings of COMPCON, 1989, pp. 143-146.

Menon, Jai, et al., Methods for Improved Update Performance of Disk Arrays, IBM Almaden Research Center, IEEE, Jan. 1992, 10 pages.

Menon, Jai, et al., Floating Parity and Data Disk Arrays, Journal of Parallel and Distributed Computing, Boston: Academic Press. Inc., vol. 17 No. 1 and 2, Jan./Feb. 1993, 13 pages.

Ng, Spencer, et al., Trade-Offs Between Devices and Paths in Achieving Disk Interleaving, IEEE International Symposium on Computer Architecture, 1988, pp. 196-201.

Ng, Spencer, Some Design Issues of Disk Arrays, Proceedings of COMPCON Spring '89, pp. 137-142. IEEE, 1989.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Storagesuite, Performance Without Compromise: The Virtual Storage Architecture, catalogue, 1997.

Reddy, A. L. Narasimha, et al., An Evaluation of Multiple-Disk I/O Systems, IEEE Transactions on Computers, vol. 38, No. 12, Dec. 1989, pp. 1680-1690.

Scheuermann, Peter, et al., Data Partitioning and Load Balancing in Parallel Disk Systems, The VLDB Journal, vol. 7, Springer-Verlag, Copyright Feb. 1998, 19 pages.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Shirriff, Kenneth W., Sawmill:A Logging File System for a High-Performance RAID Disk Array, CSD-95-862, Jan. 1995.

Stanek, William R., Microsoft Windows 2000 Server: Administering Volume Sets and RAID Arrays, Jan. 10, 2006, (http://www.microsoft.com/technet/prodtechnol/windows2000serv/maintain/operate/11w2kada.mspx), (Printed 1999).

Stodolsky, Daniel, et al., Parity Logging Overcoming the Small Write Problem in Redundant Disk Array, School of Computer Science and Department of Electrical and Computer Engineering, Carnegie Mellon University, IEEE, May 1993, 12 pages.

Stonebraker, Michael, et al., The Design of XPRS, Proceedings of the 14th VLDB Conference, LA, CA (1988).

Tanabe, Takaya, et al, Redundant Optical Storage System Using DVD-RAM Library, IEEE Symposium on Mass Storage, pp. 80-87, Mar. 1999.

Tekram—"About RAID 6".

Tweten, David, Hiding Mass Storage Under UNIX: NASA's MSS-II Architecture, IEEE Symposium on Mass Storage, pp. 140-145, May 1990.

Weikum, Gerhard, et al., Dynamic File Allocation in Disk Arrays, ETH Zurich, Department of Computer Science Information Systems—Databases, ACM SIGMOD Record, vol. 20, Issue 2, Jun. 1991, 10 pages.

Wilkes, John, et al., The HP AutoRAID hierarchical storage system, ACM Transactions on Computer Systems, Feb. 1996, vol. 14, pp. 108-136.

Notification of Transmittal of the International Search Report and the Written Opinion of the International Searching Authority, or the Declaration Apr. 27, 2006, PCT/US2006/016055.

Ganger et al., "Disk Subsystem Load Balancing: Disk Striping vs. Conventional Data Placement", Dept of Electrical Engineering and Computer Science, University of Michigan, Ann Arbor, Jan. 5, 1993.

Honicky et al. "A Fast Algorith for Online Placement and Reorganization of Replicated Data", Storage Systems Research Center, University of California, Santa Cruz, Apr. 22, 2003.

Ho et al. "A Row Permuted Data Reorganizational Algorithm for Growing Server-less Video-on-demand Systems", Department of Information Engineering, Chinese University of Hong Kong, Shatin, N.T., Hong Kong. May 12, 2003.

\* cited by examiner

*1600*

| SVS SIZE | REPEAT INTERVAL |
|---|---|
| 2 | 2 |
| 3 | 6 |
| 4 | 12 |
| 5 | 60 |
| 6 | 60 |
| 7 | 420 |
| 8 | 840 |
| 9 | 2,520 |

| SVS SIZE | REPEAT INTERVAL |
|---|---|
| 10 | 2,520 |
| 11 | 27,720 |
| 12 | 27,720 |
| 13 | 360,360 |
| 14 | 360,360 |
| 15 | 360,360 |
| 16 | 720,720 |
| 17 | 12,252,240 |

FIG. 16

DATA PLACEMENT TECHNIQUE FOR STRIPING DATA CONTAINERS ACROSS VOLUMES OF A STORAGE SYSTEM CLUSTER

CROSS-REFERENCE TO RELATED APPLICATIONS

This application is a continuation of U.S. Ser. No. 12/109,272, filed by Peter F. Corbett et al. on Apr. 24, 2008, now issued as U.S. Pat. No. 7,647,451 on Jan. 21, 2010, which is a continuation of U.S. Ser. No. 11/118,298, filed by Peter F. Corbett et al. on Apr. 29, 2005, issued as U.S. Pat. No. 7,366,837 on Apr. 29, 2008, which is a continuation-in-part of U.S. patent application Ser. No. 10/720,364, filed Nov. 24, 2003 and entitled SEMI-STATIC DISTRIBUTION TECHNIQUE, by Peter F. Corbett et al., now issued as U.S. Pat. No. 7,185,144 on Feb. 27, 2007.

The present application is also related to U.S. patent application Ser. No. 11/119,118, entitled SYSTEM AND METHOD FOR RESTRIPING DATA ACROSS A PLURALITY OF VOLUMES, by Richard Jernigan, Patent Publication No. 2006/0248379 on Nov. 2, 2006; and U.S. Pat. No. 7,698,289, issued on Apr. 13, 2010, entitled STORAGE SYSTEM ARCHITECTURE FOR STRIPING DATA CONTAINER CONTENT ACROSS VOLUMES OF A CLUSTER, by Michael Kazar et al., the contents of which are hereby incorporated by reference.

FIELD OF THE INVENTION

The present invention relates to storage systems and, more specifically, to the placement of data across a plurality of volumes in a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical unit numbers (luns). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container, such as a file, that is heavily utilized is to stripe the data container across a plurality of volumes configured as a striped volume set (SVS), where each volume is serviced by a different storage system, thereby distributing the load for the single data container among a plurality of storage systems. An example of such a data container striping technique is described in the above referenced U.S. Pat. No. 7,698,289, entitled STORAGE SYSTEM ARCHITECTURE FOR STRIPING DATA CONTAINER CONTENT ACROSS VOLUMES OF A CLUSTER. Here, stripes of content (data) of a data container are allocated in round-robin order to each volume of the SVS in sequence, wrapping around to a first volume when a last volume of the SVS is reached. This data container striping technique achieves exact or near-exact balance of data across the volumes of the SVS.

However, a noted disadvantage of such a data container striping technique arises when the number of volumes within a SVS changes. For example, if a new volume is added to or an existing volume is removed from the SVS, nearly all the stripes will have to move to a different volume to restore balance, e.g., via a re-striping operation, among all the volumes. Addition or removal of a volume from a SVS configured to implement round-robin striping is an input/output (I/O) intensive and time consuming operation that is expensive in terms of performance and duration of the re-striping operation. Yet re-striping is an important feature, as it allows users and administrators to adjust the allocation of storage and processor resources to data containers by adding or removing storage systems, or storage units, from a pool of storage systems or units used for the data containers.

SUMMARY OF THE INVENTION

The present invention overcomes the disadvantages of the prior art by providing a technique for placing content, such as data, of one or more data containers on volumes of a striped volume set (SVS). The SVS is associated with a set of striping rules that define a stripe algorithm, a stripe width and an ordered list of volumes distributed across a plurality of nodes interconnected as a cluster. The stripe algorithm specifies the manner in which the data is apportioned as stripes across the volumes, while the stripe width specifies the size/width of each stripe. Notably, the data placement technique selects a volume within which to place a stripe such that all stripes are apportioned among the volumes of the SVS in a manner that improves the efficiency of storage service provided by the cluster.

According to a first aspect of the invention, the placement of data across the volumes of the SVS allows specification of a deterministic pattern of fixed length. That is, the pattern determines a placement of data of a data container, such as a file, that is striped among the volumes of the SVS. The placement pattern is such that the stripes are distributed exactly or nearly equally among the volumes and that, within any local span of a small multiple of the number of volumes, the stripes are distributed nearly equally among the volumes.

According to a second aspect of the invention, the placement pattern is substantially similar for a plurality of SVSs having different numbers of volumes. For example, assume one or more volumes are added to existing volumes of a SVS and that stripes on the existing volumes are redistributed among the additional volumes. This aspect of the invention enables re-striping of the data by moving a minimum number of stripes, while retaining a property of balance across the new number of volumes in the SVS. In general, adding an Nth volume to a SVS having N-1 volumes requires moving 1/N of the existing stripes from each of the pre-existing N-1 volumes to the added Nth volume.

Advantageously, the data placement technique minimizes the number of stripes that have to move for any change in the number of volumes of the SVS, while retaining a property that the data is balanced or nearly balanced across those volumes. The novel technique also minimizes the cost of a re-striping operation, while potentially substantially reducing the duration of such an operation. Moreover, the novel data placement technique maintains data balance after re-striping.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 16 is a diagram of a stripe placement table illustrating a repeat interval for various SVS volume sizes in accordance with the data placement technique.

DETAILED DESCRIPTION OF AN ILLUSTRATIVE EMBODIMENT

A. Cluster Environment

Figure 1:
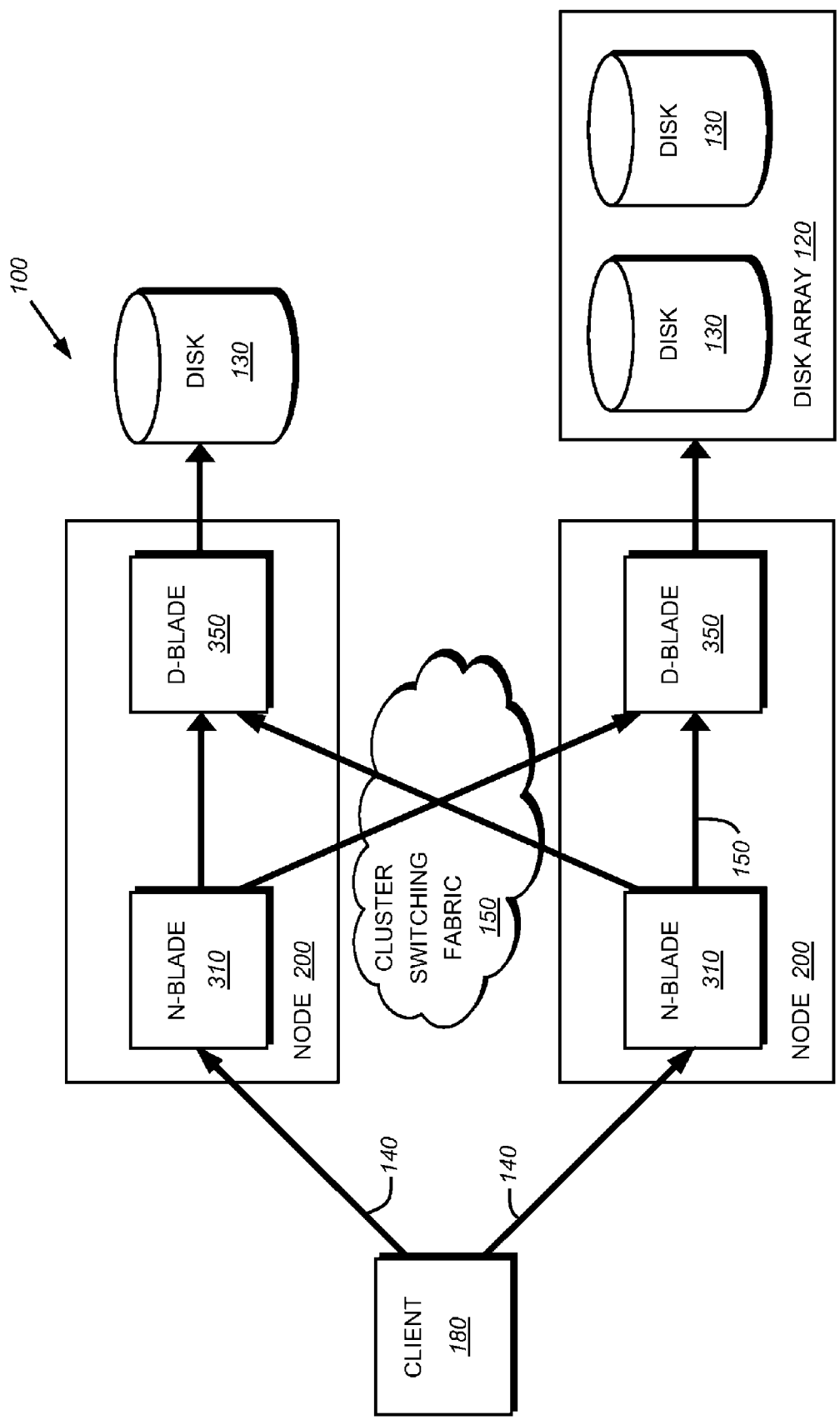
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al., issued Dec. 30, 2003.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
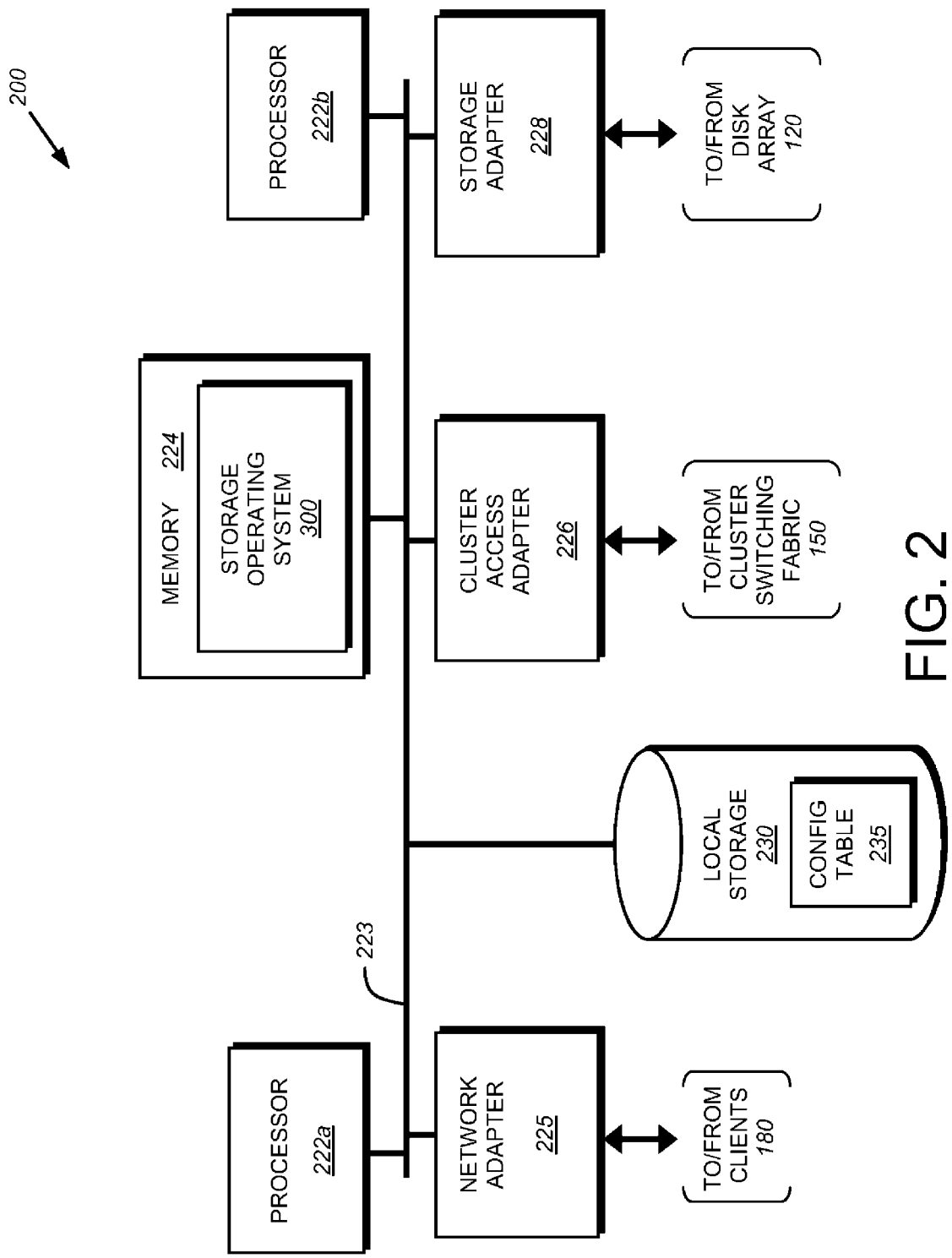
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network.

Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
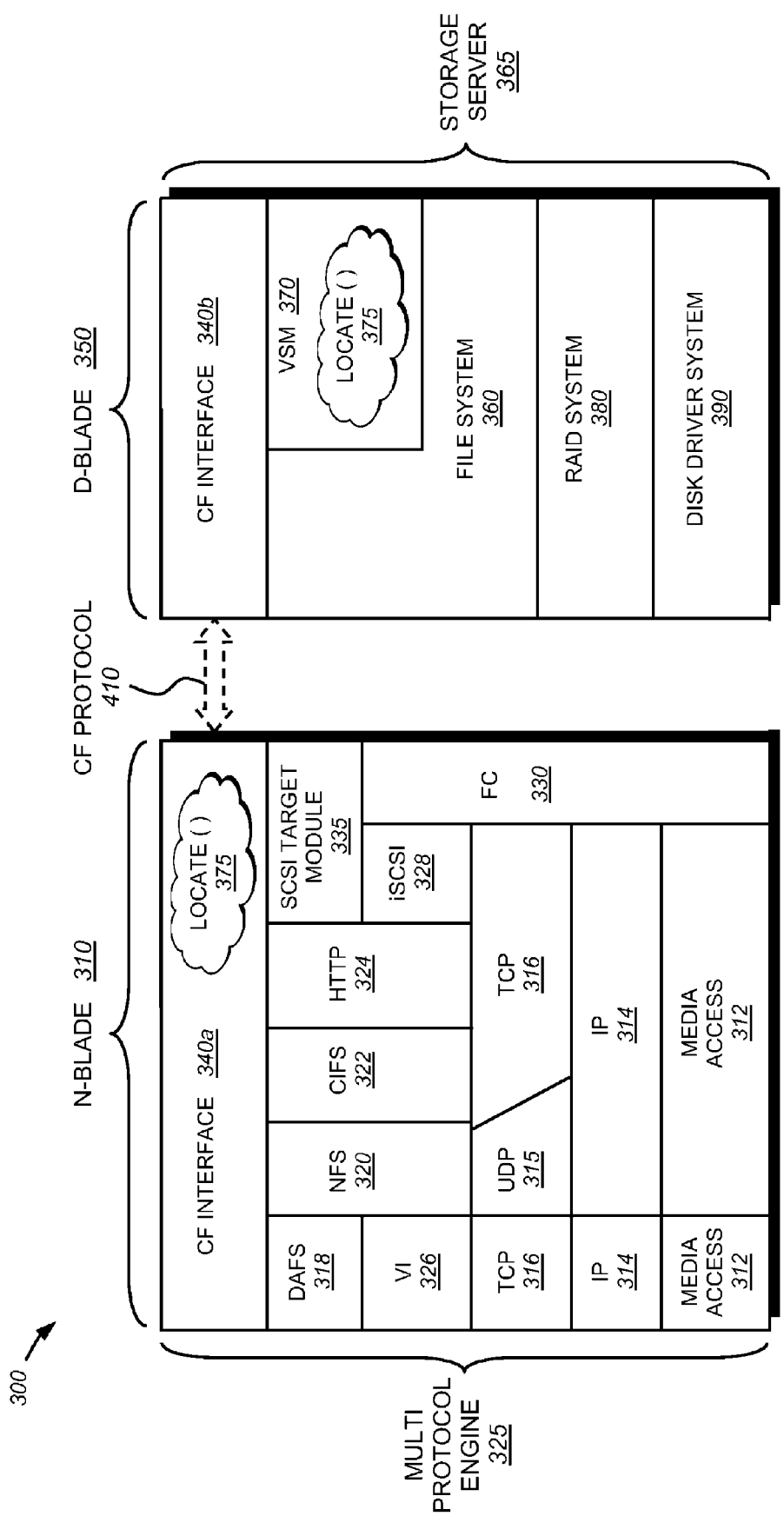
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) that may be advantageously used with the present invention. As described further herein, the VSM cooperates with the file system 360 to enable storage server 365 to service a volume of the SVS. In particular, the VSM 370 implements a novel Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a data container, e.g., file, that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340*a,b* adapted to implement intra-cluster communication among the blades, including D-blade-to-D-blade communication for data container striping operations described herein.

The protocol layers, e.g., the NFS/CIFS layers and the iSCSI/FC layers, of the N-blade 310 function as protocol servers that translate file-based and block-based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340*a* on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340*b* on D-blade 350 de-encapsulates the CF message and processes the file system command.

Figure 4:
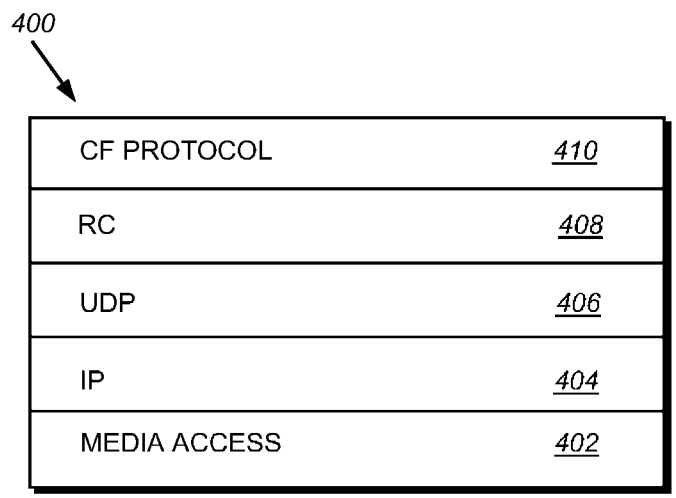
FIG. 4 is a schematic block diagram illustrating the format of a cluster fabric message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote blades of the cluster 100; however, it should be understood that the term "CF message" may be used generally to refer to LPC and RPC communication between blades of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-blade 310) to a destination (e.g., a D-blade 350). The RC layer 408 implements a reliable transport protocol that is adapted to process such envelopes in accordance with a connectionless protocol, such as UDP 406.

Figure 5:
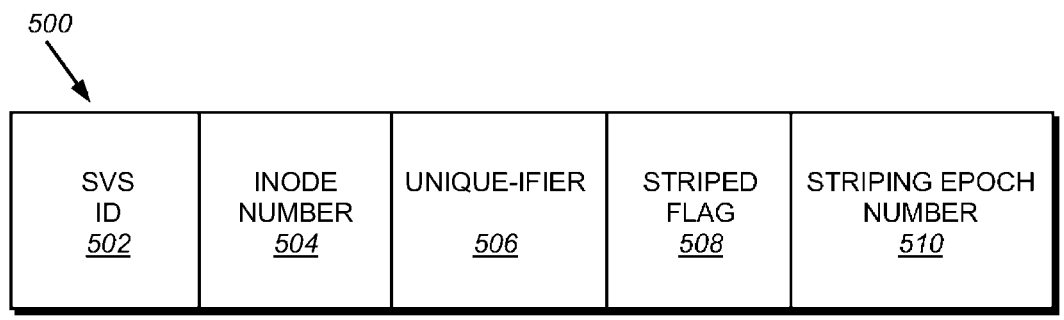
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506 a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
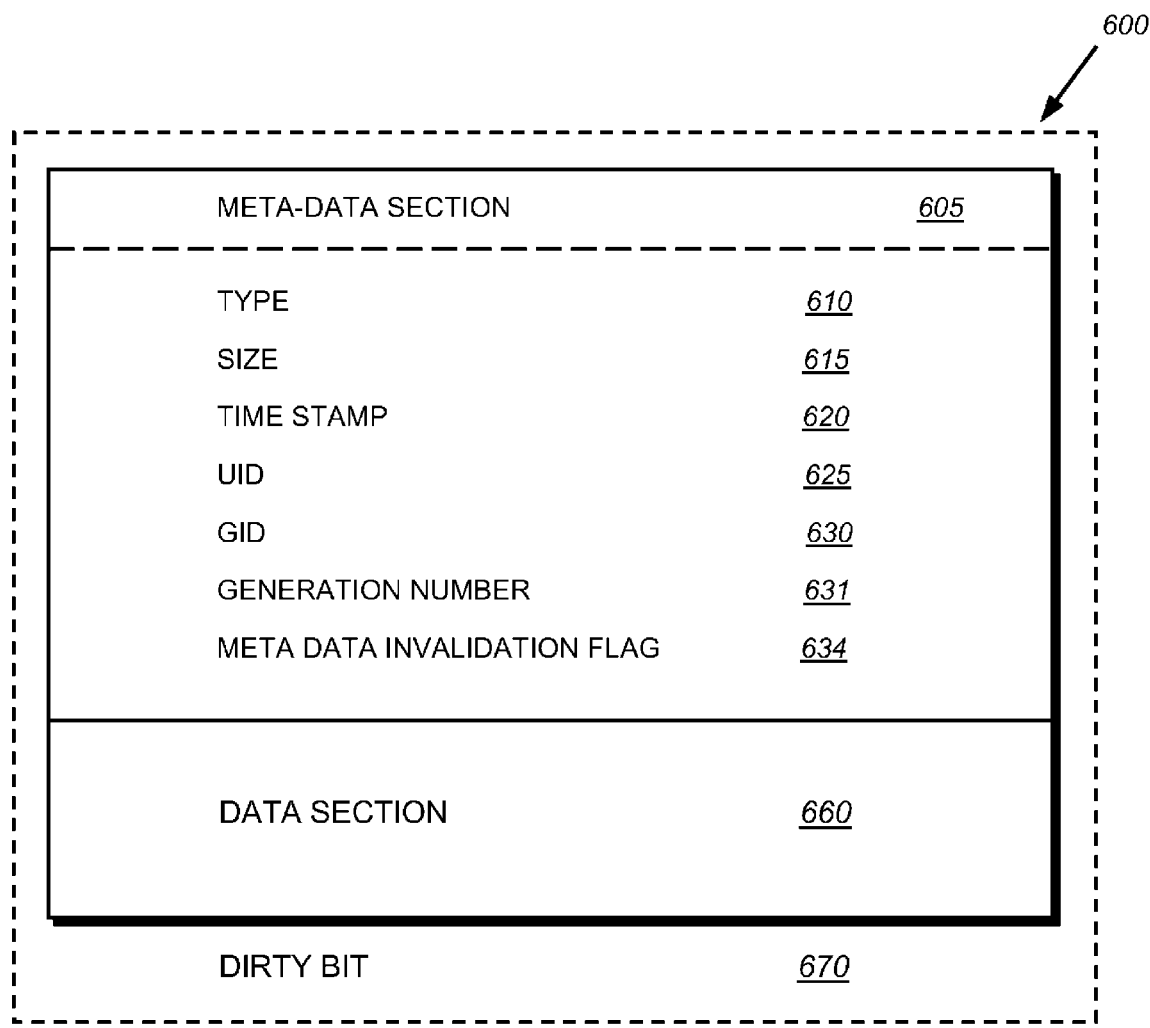
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a metadata section 605 and a data section 660. The information stored in the metadata section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The metadata section 605 also includes a generation number 640, and a meta data invalidation flag field 650. As described further herein, metadata invalidation flag field 650 is used to indicate whether metadata in this inode is usable or whether it should be re-acquired from the MDV. The contents of the data section 660 of each inode may be interpreted differently depending upon the type of file (inode) defined within the type field 610. For example, the data section 660 of a directory inode contains metadata controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819, 292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
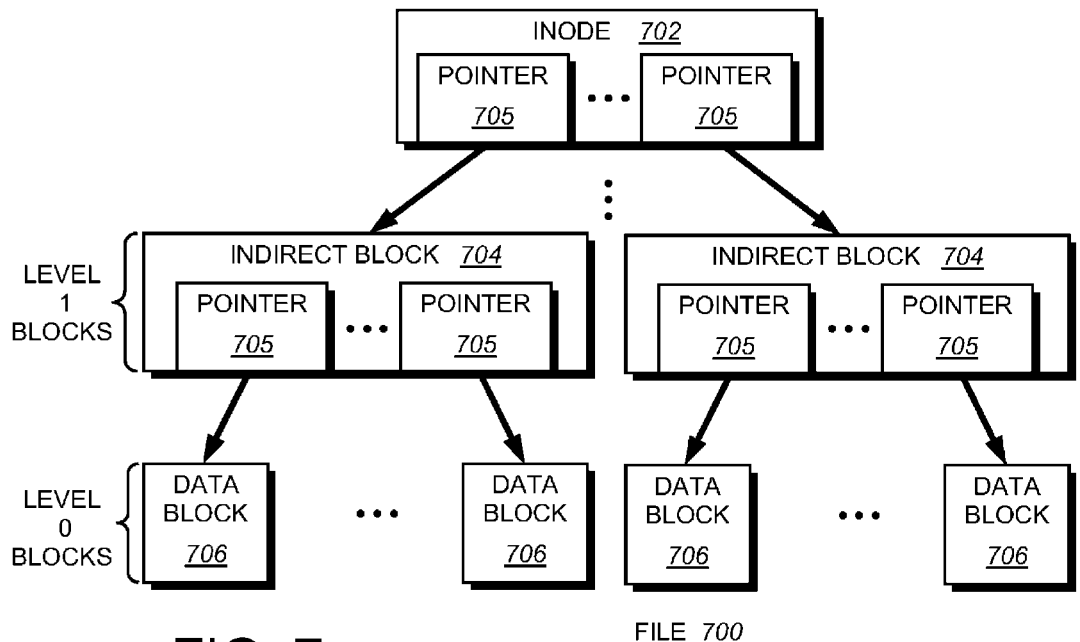
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. Pat. No. 7,409,494 titled EXTENSION OF WRITE ANY-WHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains metadata, such as block allocation structures, within that pvbn space. Each flexible volume has its own virtual volume block number (vvbn) space and maintains metadata, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
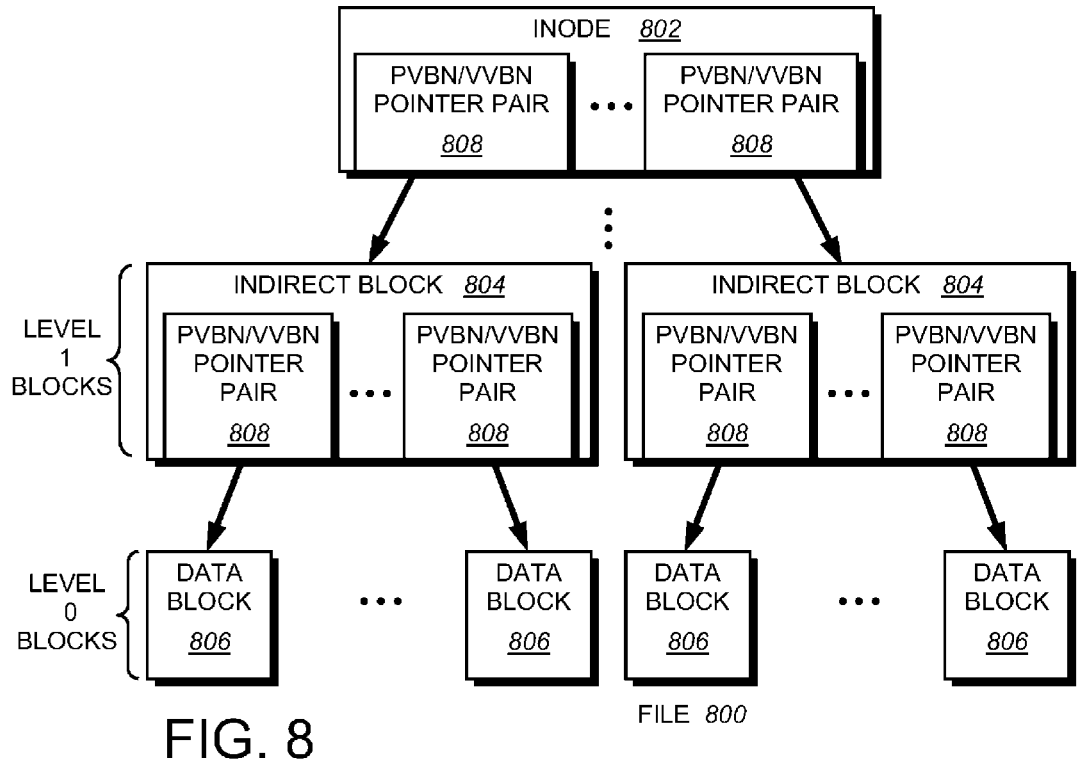
FIG. 8 is a schematic block diagram of an illustrative embodiment of a buffer tree of a file that may be advantageously used with the present invention.

In an illustrative dual vbn hybrid embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1(L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
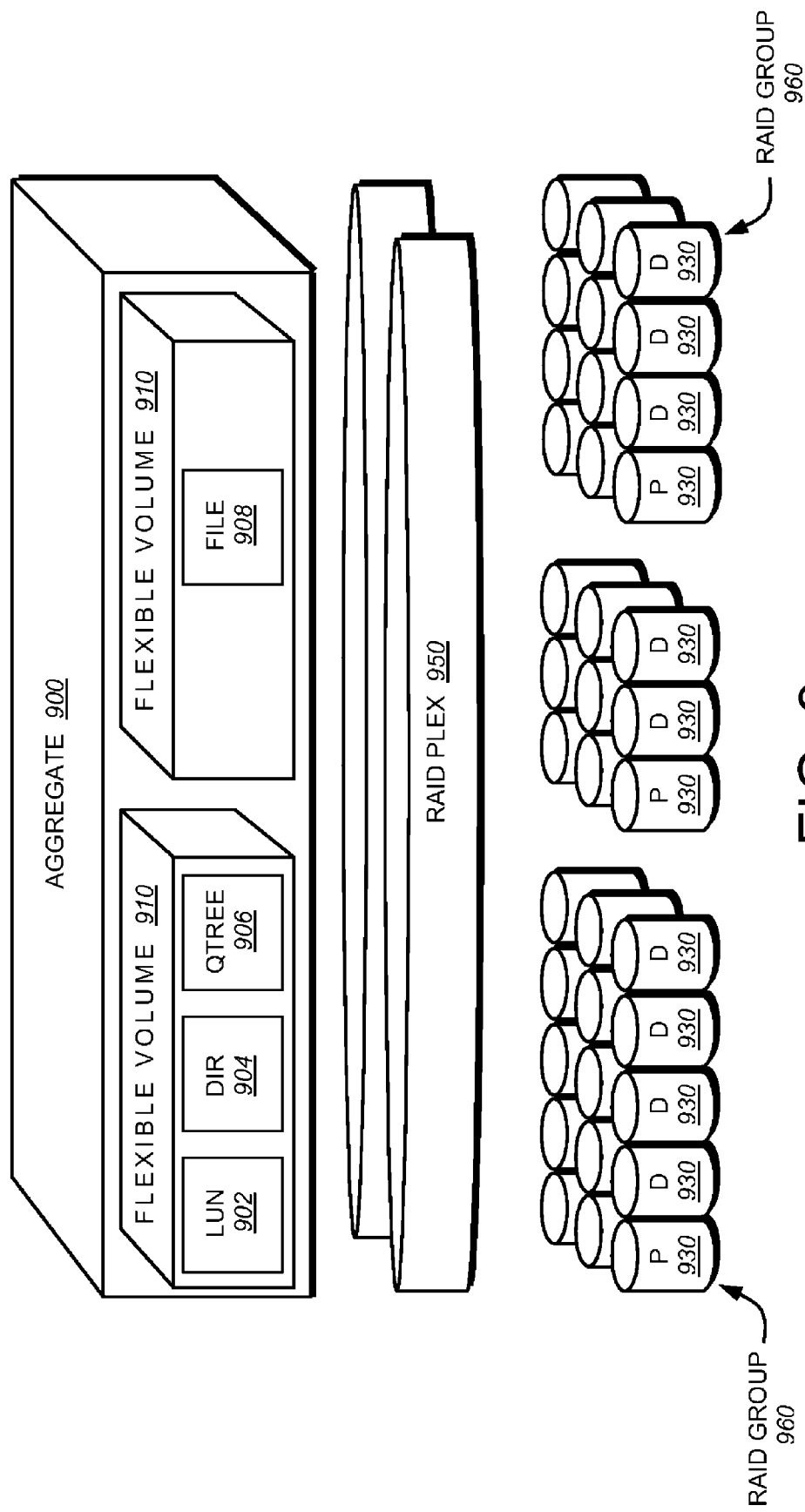
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
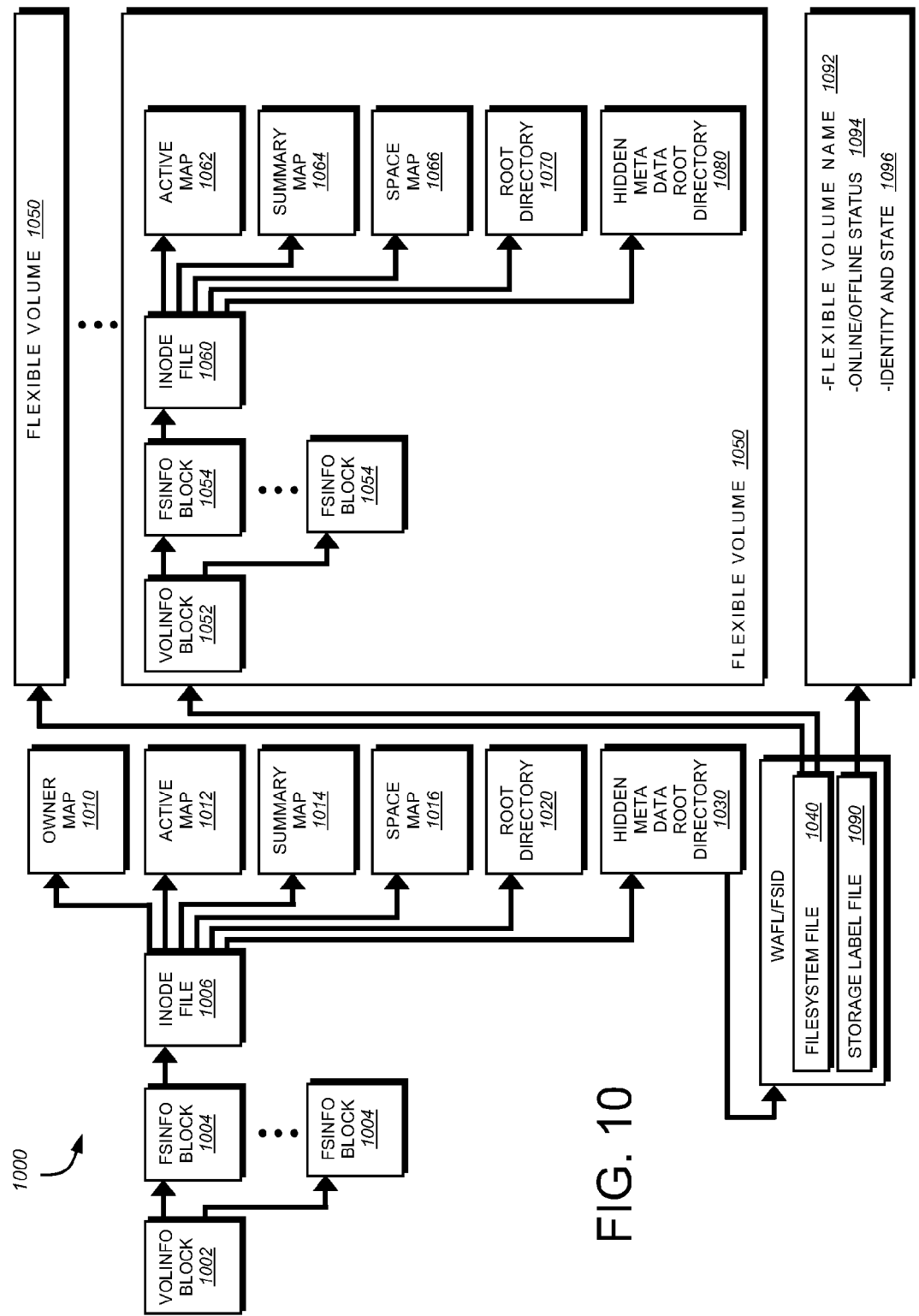
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains modes of a plurality of files, including an owner map 1010, an active map 1012, a summary map 1014 and a space map 1016, as well as other special metadata files. The inode file 1006 further includes a root directory 1020 and a "hidden" metadata root directory 1030, the latter of which includes a namespace having files related to a flexible volume in which users cannot "see" the files. The hidden metadata root directory includes the WAFL/fsid/directory structure that contains filesystem file 1040 and storage label file 1090. Note that root directory 1020 in the aggregate is empty; all files related to the aggregate are organized within the hidden metadata root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden metadata root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden metadata root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
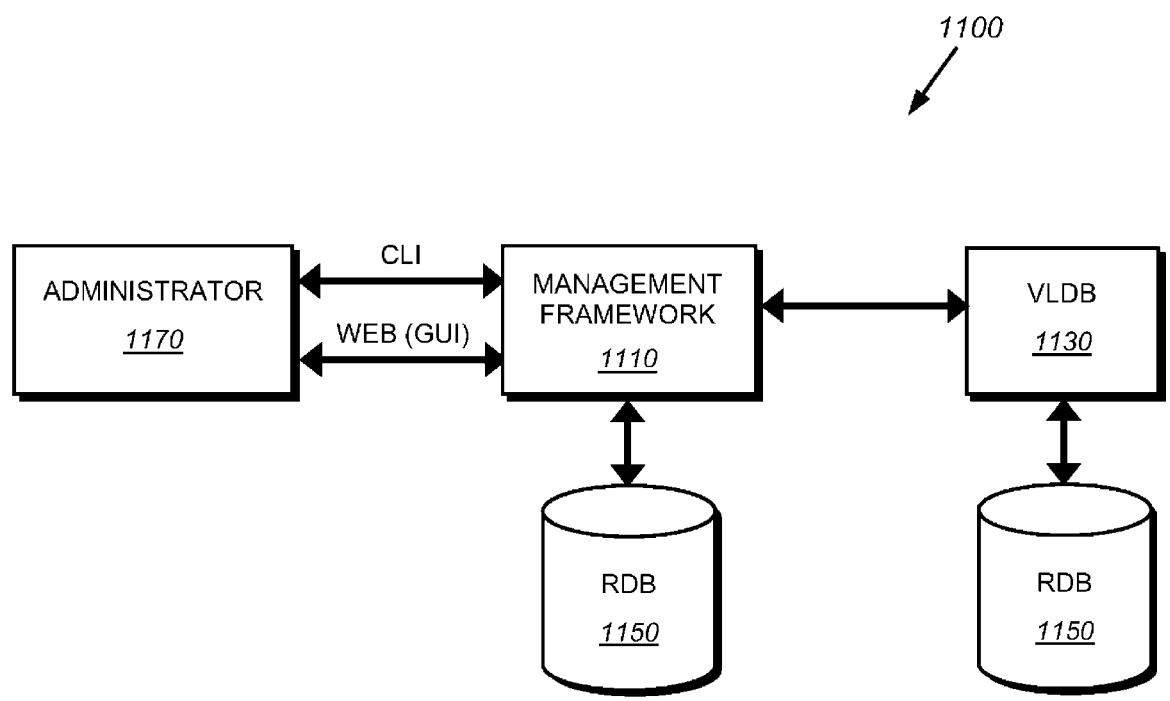
FIG. 11 is a schematic block diagram illustrating a collection of management processes in accordance with an embodiment of the present invention.

FIG. 11 is a schematic block diagram illustrating a collection of management processes that execute as user inode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user or an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-blade 310 of each node accesses a configuration table 235 that maps the SVS ID 502 of a data container handle 500 to a D-blade 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
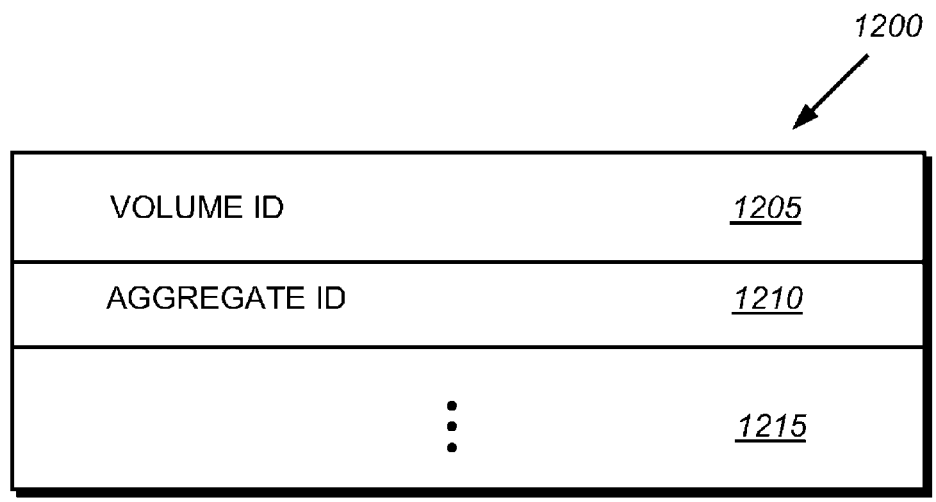
FIG. 12 is a schematic block diagram of a volume location database (VLDB) volume entry in accordance with an embodiment of the present invention.
Figure 13:
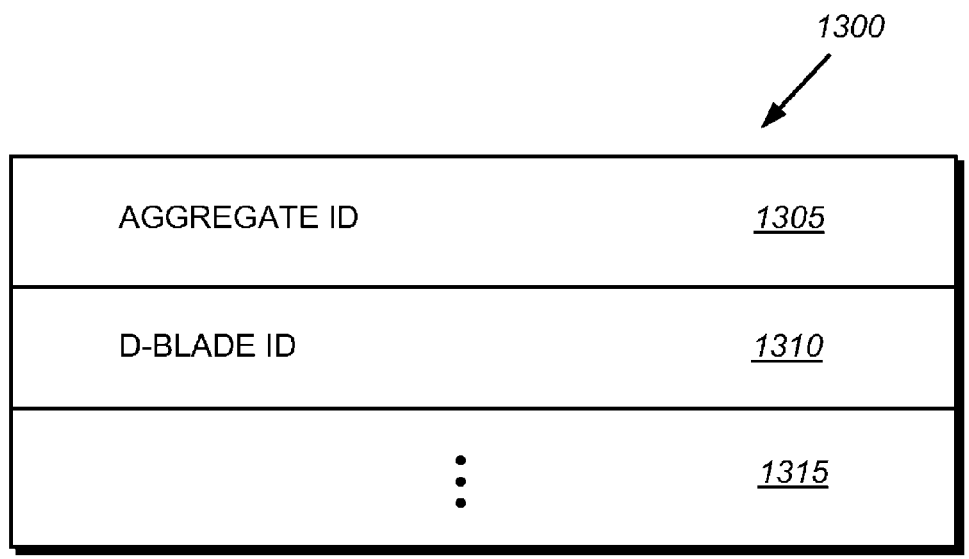
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-blade ID field 1310 and, in alternate embodiments, additional fields 1315. The aggregate ID field 1305 contains an ID of a particular aggregate 900 in the cluster 100. The D-blade ID field 1310 contains an ID of the D-blade hosting the particular aggregate identified by the aggregate ID field 1305.

The VLDB illustratively implements a RPC interface, e.g., a Sun RPC interface, which allows the N-blade 310 to query the VLDB 1130. When encountering contents of a data container handle 500 that are not stored in its configuration table, the N-blade sends an RPC to the VLDB process. In response, the VLDB 1130 returns to the N-blade the appropriate mapping information, including an ID of the D-blade that owns the data container. The N-blade caches the information in its configuration table 235 and uses the D-blade ID to forward the incoming request to the appropriate data container. All functions and interactions between the N-blade 310 and D-blade 350 are coordinated on a cluster-wide basis through the collection of management processes and the RDB library user inode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is related to a storage system architecture illustratively comprising of two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

Figure 14:
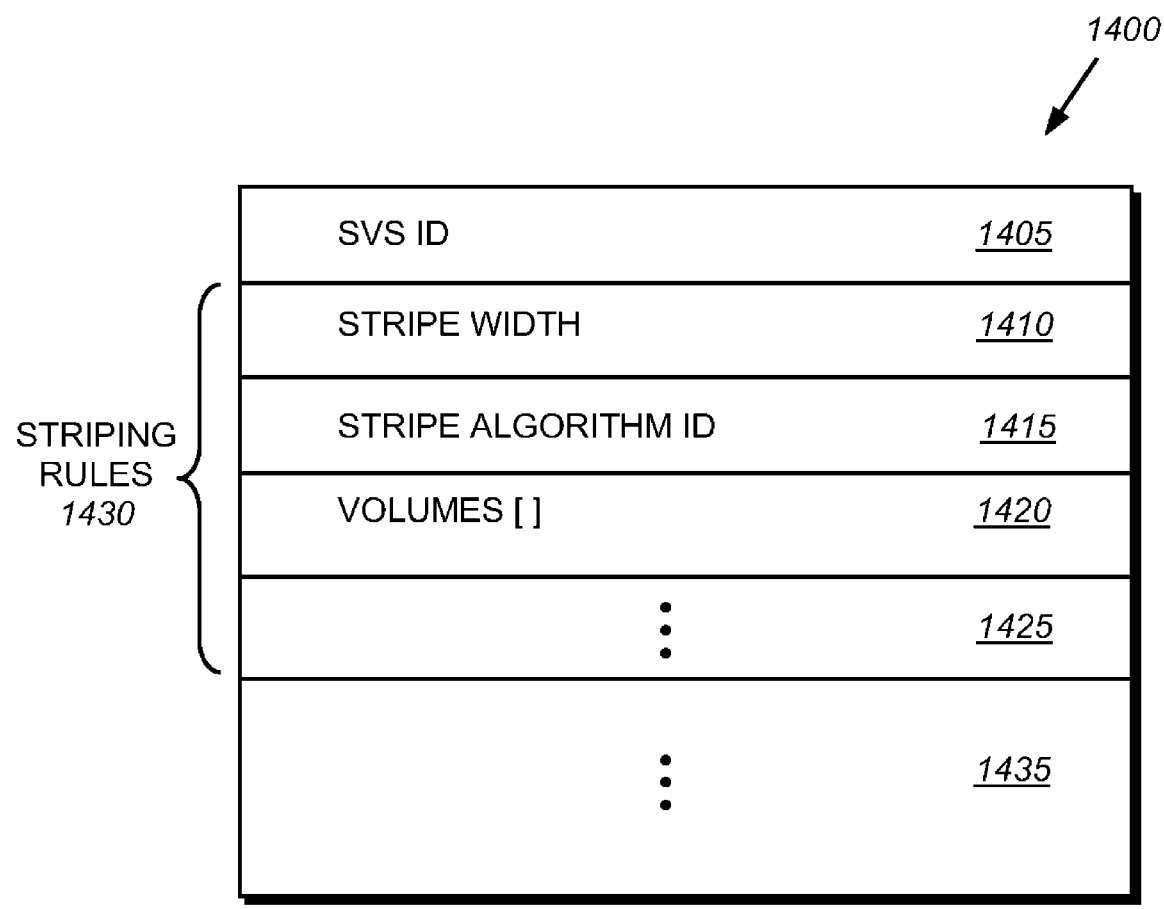
FIG. 14 is a schematic block diagram of a VLDB striped volume set (SVS) entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 14 is a schematic block diagram of an exemplary VLDB SVS entry 1400 in accordance with an embodiment of the present invention. The VLDB entry 1400 includes a SVS ID field 1405 and one or more sets of striping rules 1430. In alternate embodiments additional fields 1435 may be included. The SVS ID field 1405 contains the ID of a SVS which, in operation, is specified in data container handle 500.

Each set of striping rules 1430 illustratively includes a stripe width field 1410, a stripe algorithm ID field 1415, an ordered list of volumes field 1420 and, in alternate embodiments, additional fields 1425. The striping rules 1430 contain information for identifying the organization of a SVS. For example, the stripe algorithm ID field 1415 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1410 specifies the size/width of each stripe. The ordered list of volumes field 1420 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

A Locate( ) function 375 is provided that enables the VSM 370 and other modules (such as those of N-blade 310) to locate a D-blade 350 and its associated volume of a SVS in order to service an access request to a file. The Locate( ) function takes as arguments, at least (i) a SVS ID 1405, (ii) an offset within the file, (iii) the inode number for the file and (iv) a set of striping rules 1430, and returns the volume 910 on which that offset begins within the SVS. For example, assume a data access request directed to a file is issued by a client 180 and received at the N-blade 310 of a node 200, where it is parsed through the multi-protocol engine 325 to the appropriate protocol server of N-blade 310. To determine the location of a D-blade 350 to which to transmit a CF message 400, the N-blade 310 may first retrieve a SVS entry 1400 to acquire the striping rules 1430 (and list of volumes 1420) associated with the SVS. The N-blade 310 then executes the Locate( ) function 375 to identify the appropriate volume to which to direct an operation. Thereafter, the N-Blade may retrieve the appropriate VLDB volume entry 1200 to identify the aggregate containing the volume and the appropriate VLDB aggregate entry 1300 to ultimately identify the appropriate D-blade 350. The protocol server of N-blade 310 then transmits the CF message 400 to the D-blade 350.

H. Data Placement Technique

The present invention is directed to a technique for placing content, such as data, of one or more data containers on volumes of a SVS. As noted, the SVS is associated with a set of striping rules that define a stripe algorithm, a stripe width and an ordered list of volumes distributed across the nodes 200 interconnected as cluster 100. The stripe algorithm specifies the manner in which the data is apportioned as stripes across the volumes, while the stripe width specifies the size/width of each stripe. Notably, the data placement technique selects a volume within which to place a stripe such that all stripes are apportioned among the volumes of the SVS in a manner that improves the efficiency of storage service provided by the cluster.

In the illustrative embodiment, the inventive data placement technique is preferably implemented by the VSM 370 cooperating with the file system 360 of storage operating system 300 that, among other things, controls the layout of data on the SVS. The parameters involved with the data placement technique include (i) a "chunk" or stripe width and (ii) the number of volumes of a SVS. Specifically, the data of each data container is organized (divided) into stripes, wherein each stripe has a predetermined stripe width. Illustratively, the stripe width is 2 MB, although it should be noted that other stripe widths may be selected in accordance with the present invention. Preferably, though, the selected stripe width should be a multiple of the on-disk block size (e.g., 4 kB) and equal to a power of 2, the latter to enable efficient arithmetic computations.

According to a first aspect of the invention, the placement of data across the volumes of the SVS allows specification of (i.e., reflects) a deterministic pattern of fixed length. That is, the pattern determines a placement of data of a data container, such as a file, that is striped among the volumes of the SVS. The placement pattern is such that the stripes are distributed exactly or nearly equally among the volumes and that, within any local span of a small multiple of the number of volumes, the stripes are distributed nearly equally among the volumes.

Figure 15A:
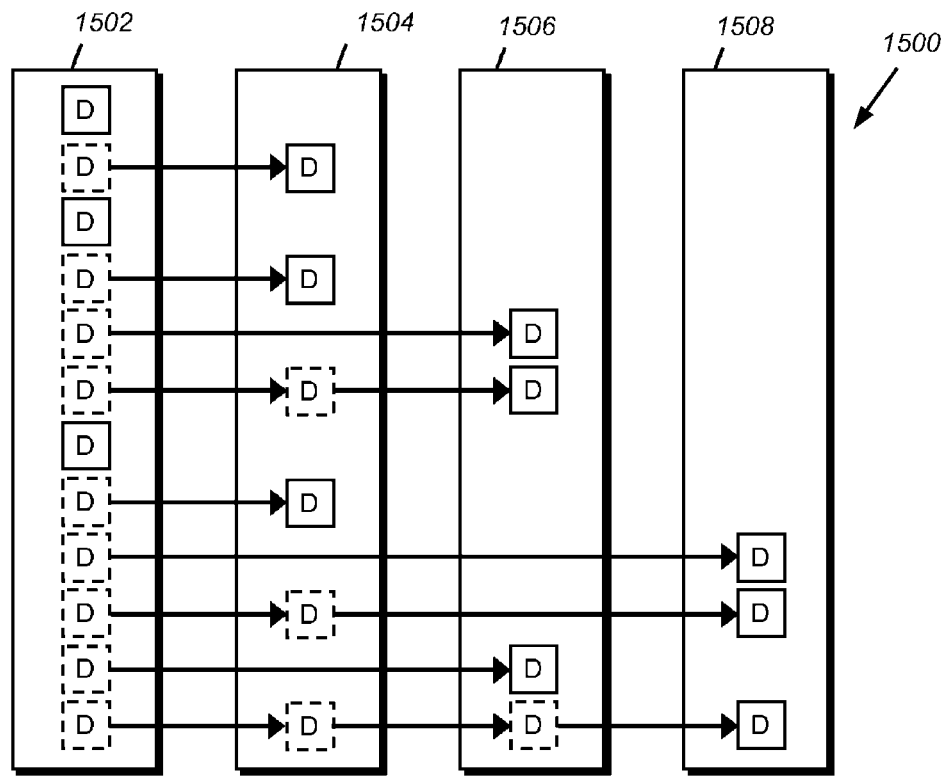
FIG. 15A is a schematic diagram illustrating placement of stripes of data of a data container across volumes of an exemplary SVS according to a data placement technique of the present invention.

FIG. 15A is a schematic diagram illustrating the placement of stripes of data of a data container across volumes of an exemplary SVS 1500 according to the data placement technique of the present invention. Assume SVS 1500 initially comprises one volume 1502 configured to store all data of the data container; therefore, each stripe on the volume stores data (D). When a second volume 1504 is added to expand the SVS, the stripes may be distributed between the two volumes. Likewise, when a third volume 1506 and, thereafter, a fourth volume 1508 are added to the expanded SVS, the stripes may be distributed among those volumes.

Stripes of data (D) may be distributed among the volumes in accordance with the inventive technique that reassigns one of N stripes from each pre-existing volume to the added volume, wherein N is equal to the number of volumes in the expanded SVS. Overall, one of N stripes is reassigned to the added volume, with each pre-existing volume continuing to hold exactly 1/N of the stripes in the expanded SVS. For a 2-volume SVS, every other stripe on the first volume 1502 is moved to the second volume 1504. When the third volume 1506 is added to the expanded SVS 1500, thereby creating a 3-volume SVS, every third remaining stripe on the first volume 1506, as well as every third stripe on the second volume 1504, is moved to the third volume 1506. When the fourth volume 1508 is added to the SVS, creating a 4-volume SVS, every fourth remaining stripe from each volume (volumes 1502-1506) is moved to the fourth volume 1508.

According to a second aspect of the invention, the placement pattern is substantially similar for a plurality of SVSs having different numbers of volumes. For example, assume one or more volumes are added to existing volumes of a SVS and that stripes on the existing volumes are redistributed among the additional volumes. This aspect of the invention enables re-striping of the data by moving a minimum number of stripes, while retaining a property of balance across the new number of volumes in the SVS. In general, adding an Nth volume to a SVS having N−1 volumes requires moving 1/N of the existing stripes from each of the pre-existing N−1 volumes to the added Nth volume.

Figure 15B:
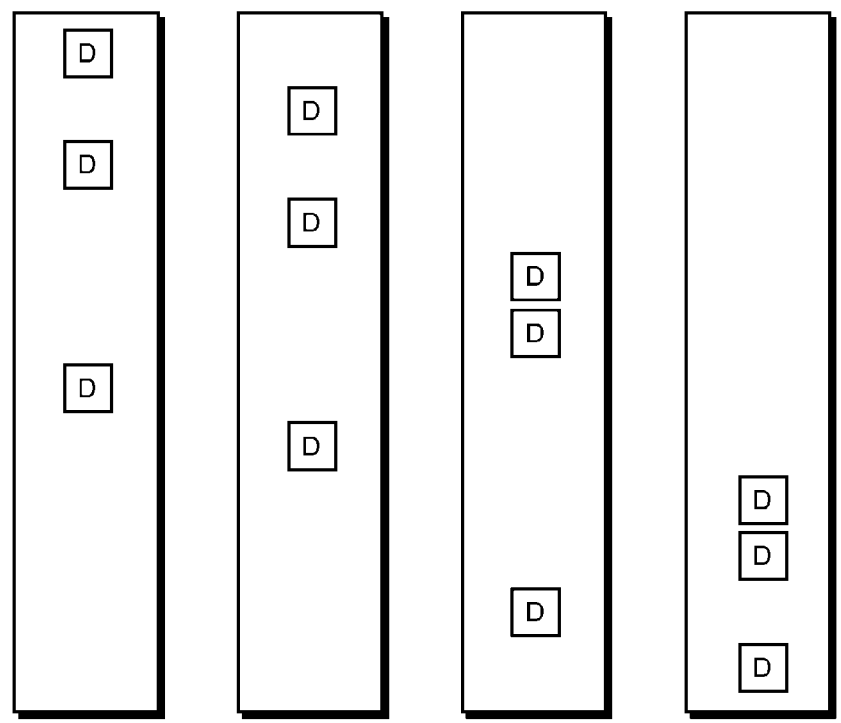
FIG. 15B is a schematic diagram illustrating reassignment of stripes of data of the data container across volumes of the exemplary SVS of FIG. 17A according to the data placement technique of the present invention.

FIG. 15B is a schematic diagram illustrating reassignment of stripes of data of the data container across volumes of the exemplary SVS 1500 according to the data placement technique of the present invention. As a result of this reassignment, the amount of data (D) on each volume is substantially the same. The location of the data stripe also changes across the volumes of the SVS in a predictable and deterministic pattern. That is, given a stripe width and number of volumes in a SVS, the data placement technique determines the location of each stripe on a volume of the SVS. This aspect of the novel technique may be embodied as a data structure of stripe placements having a predetermined size (i.e., number of entries).

Specifically, the data placement technique can be implemented by storing or generating a data structure (e.g., a table) in memory containing the placement of stripes for a specific number of volumes in a SVS of specific size. It is also possible to store in a single table all possible placements of stripes for any SVS size up to a certain limit. Here, for example, the table may store a bitmap for each SVS, where the one (or more) highest numbered bit set is selected that is less than N, wherein N is the number of volumes in the SVS. In general, any table-based stripe placement that maintains balance of distributed data is contemplated by the present invention. The locations of data stripes for the data placement technique are calculated for a known size of SVS volumes or for a maximum volume size of the SVS; either way, as noted, the calculated stripe locations may be stored in a table. A data placement pattern defined by the stored locations and, in particular, a repeat interval of the pattern can be used to determine the location of data stripes on any volume in the SVS for a given size.

FIG. 16 is a diagram of a stripe placement table 1600 illustrating the repeat interval for various SVS sizes in accordance with the data placement technique. The stripe placement pattern repeats at a repetition interval dependent upon the size of the SVS. If a SVS size N (i.e., N volumes) repeats every K stripes then the SVS size (N+1) will repeat in the smallest number that both K and (N+1) evenly divide. Notably, the content of the table does not repeat until it reaches a number (repeat interval) dependent on the value of N, where N equals the number of volumes. For example, in a 2-volume SVS, the stripe placement pattern repeats every two stripes. When a third volume is added, the stripe pattern repeats every six stripes. When a fourth volume is added, the stripe pattern repeats every twelve stripes. It can be seen from table 1600 that for a SVS size of five (and six), the stripe pattern repeats every sixty stripes.

The repeat interval as a function of SVS size is determined in accordance with the set of unique prime factors ("primes") up to N, where N equals the number of volumes. The repeat interval (which is equivalent to the number of entries in table 1600) is less than N factorial and, in fact, is equal to the product of all primes less than or equal to N, with each prime raised to the largest power possible such that the result is less than or equal to N. As some of the numbers between one and N are prime numbers, it is clear that the repeat interval may get large, making the table large. For example, for N=10, the table size is $2^3 \times 3^2 \times 5^1 \times 7^1 = 8 \times 9 \times 5 \times 7 = 2520$. Similarly, for N=32, the table size is $2^5 \times 3^3 \times 5^2 \times 7^1 \times 11^1 \times 13^1 \times 17^1 \times 19^1 \times 23^1 \times 29^1 \times 31^1 = 32 \times 27 \times 25 \times 7 \times 11 \times 13 \times 17 \times 19 \times 23 \times 29 \times 31 \cong 144 \times 10^{12}$.

A tradeoff may then be made between the table size of the pattern and precision of balancing; the table can be terminated at a reasonable point and the SVS size at that particular repeat interval can be used. Thereafter, even if there are more volumes than the SVS size, the technique can continue to repeat the pattern and still realize nearly uniform balance of data across the SVS within, e.g., a half percent. For example, as noted above, a SVS size of ten volumes translates into a stripe placement pattern that repeats every 2,520 stripes. A table of this size (i.e., 2,520 entries) is relatively compact in memory and can be computed relatively quickly at start-up using appropriate software code. In contrast, the table for a SVS of 32 volumes (i.e., $144 \times 10^{12}$ entries) is too large to store in memory.

The 2,520 entry table works well with any reasonable number of volumes to provide good data balance; however, it should be noted that this size table is not the only choice and other sized tables may also be used. The 2,520 entry pattern is perfectly balanced for N volumes up to ten; for N greater than 10, the pattern provides good data balance even though the pattern has not repeated. In other words, although the stripe placement table for a 17-volume SVS is rather large (7.7 MB with 5 bits per pattern), if only a fraction of the table is used, good data balance can still be achieved. Cutting off the pattern at 2,520, for example, yields perfect balance for all SVS sizes up to 10 volumes, and less than 1% imbalance to larger SVSs while limiting the table size to 2520×4 bits=1260 bytes for N=11 and 5×2520 bits=1,575 bytes for N=17 to 32.

The stripe placement table 1600 can be encoded as a single number indicating a bit position of data stripes for a particular value of N. The table can also be encoded as a single table indicating (for all SVS sizes up to some limit, e.g., 32 volumes) what volumes possibly contain stripes. The determination of which volume actually contains a stripe for a specific value of N is then made by masking off the high order 32-N bits and selecting the highest order remaining one or two (or more) bits.

Figure 17:
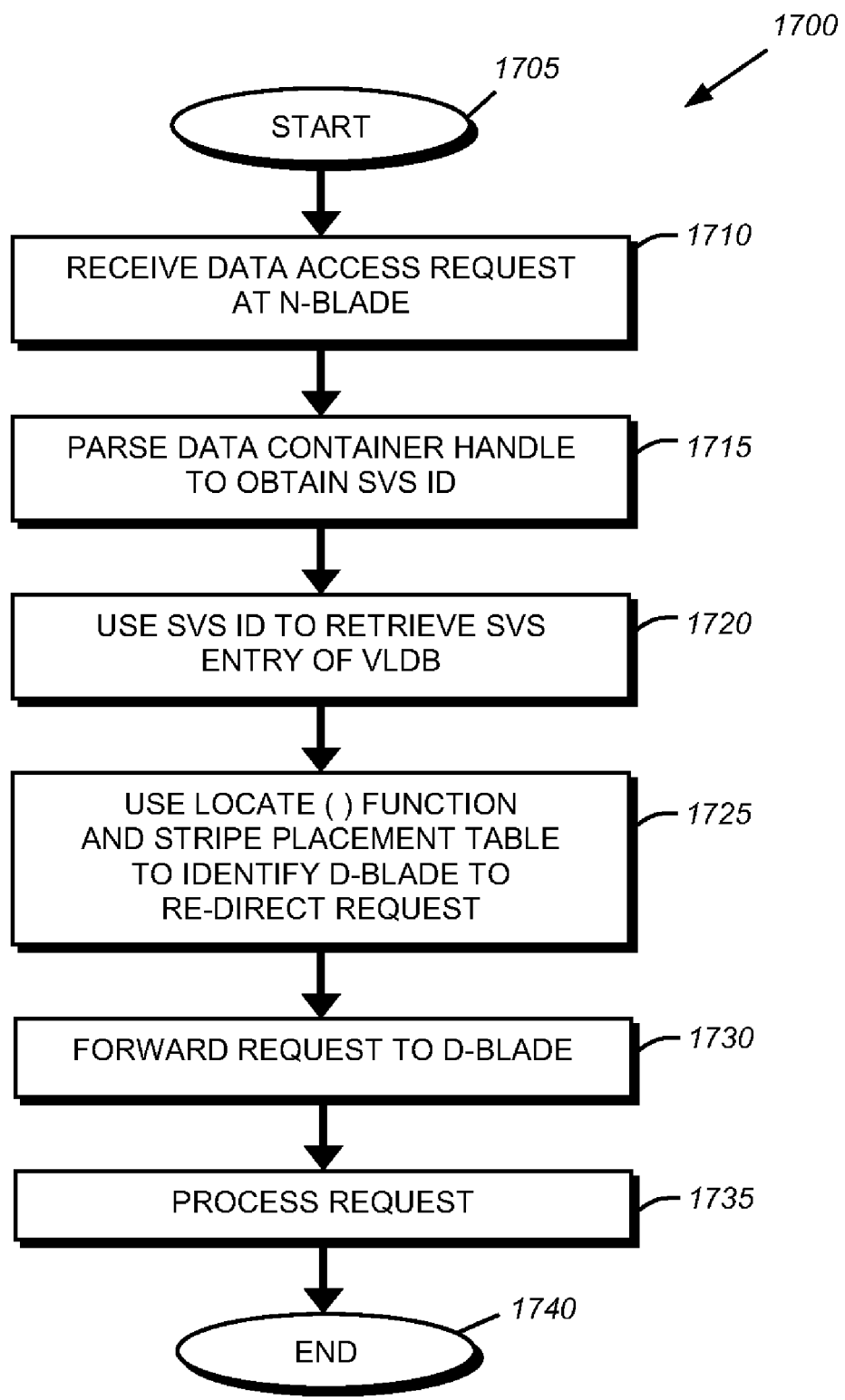
FIG. 17 is a flowchart illustrating a sequence of steps for distributing data stripes of a file among volumes of a SVS in accordance with an illustrative embodiment of the data placement technique of the present invention.

FIG. 17 is a flowchart detailing the steps of a procedure for accessing data in response to a data access request directed to a data container served by the cluster 100 in accordance with the data placement technique of the present invention. The procedure starts in step 1705 and continues to step 1710 where a data access request, e.g., a read request, is received at an N-blade 310 of a node 200 in cluster 100. For example, assume the read request is directed to a data container, such as a file, at an offset of 3 MB-4 MB. In Step 1715, the N-blade parses the data container handle 500 associated with the read request to obtain the SVS ID 502 and inode number 504 of the file. As noted, the SVS ID 502 is a global identifier (within the cluster 100) of the SVS within which the file resides and the inode number 504 is the number of an inode (within an inode file) pertaining to the file.

To determine the location of a D-blade 350 to which to transmit a CF message 400, the N-blade 310 uses the SVS ID 502 to retrieve an appropriate SVS entry 1400 of VLDB 1130 in Step 1720. The SVS entry 1400 defines the striping rules 1430, including the stripe width 1410, stripe algorithm ID 1415 and ordered list of volumes 1420, associated with the SVS. As noted, the stripe width 1410 specifies the width of each stripe (e.g., 2 MB) and the ordered list of volumes 1420 specifies the number of volumes in the SVS. Moreover, the stripe algorithm ID 1415 identifies a striping algorithm used with the SVS. In the illustrative embodiment, the stripe algorithm is an algorithm associated with the data placement technique and, as such, is assigned a unique stripe algorithm ID.

In Step 1725, the N-blade utilizes the Locate( ) function 375 to identify the D-blade to which to re-direct the request. As further noted, the Locate( ) function takes as arguments, among others, the set of striping rules 1430, inode number 504 and the offset into the file and, according to the invention, returns the identity (ID) of the appropriate volume that serves the stripe associated with file offset. To that end, the N-blade computes a stripe number by dividing the file offset of the request by the stripe width, and then determines the location of the stripe affected by the read request by indexing into the stripe placement table 1600 using the computed stripe number, e.g., the stripe number modulo the table size. In step 1730, the N-blade forwards the request to the appropriate D-blade 350, where the file system 360 and VSM 370 process the request in Step 1735. An example of a technique for processing a data access request directed to a SVS is described in the above-referenced U.S. Pat. No. 7,698,289, entitled STORAGE SYSTEM ARCHITECTURE FOR STRIPING DATA CONTAINER CONTENT ACROSS VOLUMES OF A CLUSTER. The procedure then ends in step 1740.

Advantageously, the data placement technique minimizes the number of stripes that have to move for any change in the number of volumes of the SVS, while retaining a property that the data is balanced or nearly balanced across those volumes. The novel technique also minimizes the cost of a re-striping operation, while potentially substantially reducing the duration of such an operation. Moreover, the novel data placement technique maintains data balance after re-striping.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for storing data on a computer data storage system, comprising:
   defining a plurality of nodes, each node having a computer of the computer data storage system to make a plurality of computers;
   coupling one or more data storage devices to each computer of the plurality of computers to make a plurality of data storage devices;
   implementing a plurality of volumes of data storage on the plurality of data storage devices, the plurality of volumes equal to N-1 volumes;
   defining a data container to hold data stored by the data storage system;
   striping the data container over the N-1 volumes to store the data in the data container in stripes over the plurality of nodes; and
   adding a new volume to the data storage system, to make N volumes, and moving 1/N of the stripes from the N-1 volumes to the new volume of the N volumes.

2. The method as in claim 1, further comprising:
   maintaining the striping of the data container across the N volumes so that repetitive access to the data container is distributed among different data storage devices coupled to different nodes.

3. The method as in claim 1, further comprising:
   maintaining a volume location database (VLDB), where an entry in the VLDB keeps track of a selected volume of the N volumes, and the plurality of nodes and the plurality of data storage devices making up the selected volume.

4. The method as in claim 1, further comprising:
   receiving a data access request by a first computer of the plurality of computers, the request identifying the data container;
   identifying a second computer of the plurality of computers, the second computer maintaining the data container;
   locating a selected volume maintaining the data of the data container;
   maintaining a volume location database (VLDB), where an entry in the VLDB keeps track of the selected volume of the N volumes, and one or more of the plurality of data storage devices making up the selected volume; and
   directing, in response to querying the VLDB, the data access request to a selected data storage device of the plurality of data storage devices making up the selected volume.

5. The method as in claim 1, further comprising:
   placing the stripes substantially equally among the N volumes over which the stripe is placed.

6. The method as in claim 1, further comprising:
   placing the stripes for different data containers across different volumes and placing the stripes for the different data containers substantially equally among the different volumes over which the stripes are placed.

7. The method as in claim 1, further comprising:
   using a file as the data container.

8. The method as in claim 1, further comprising:
   using a logical unit number as the data container.

9. The method as in claim 1, further comprising:
   striping the data container over the N volumes of data storage devices as a striped volume set (SVS).

10. The method of claim 1, further comprising:
    using a magnetic disk as a storage device of the plurality of data storage devices.

11. The method of claim 1, further comprising:
    using a RAID array of storage disks as a storage device of the plurality of data storage devices.

12. The method of claim 1, further comprising:
    using an optical storage device as a storage device of the plurality of data storage devices.

13. The method of claim 1, further comprising:
    using an electronic random access memory as a storage device of the plurality of data storage devices.

14. A computer data storage system apparatus, comprising:
    a plurality of nodes, each node having a computer of the computer data storage system to make a plurality of computers;
    one or more data storage devices coupled to each computer of the plurality of computers to make a plurality of data storage devices;
    a plurality of volumes of data storage implemented on the plurality of data storage devices, the plurality of volumes equal to N-1 volumes;
    a data container defined to hold data stored by the data storage system;
    the data container striped over the N-1 volumes to store the data in the data container in stripes over the plurality of nodes; and
    a new volume added to the data storage system, to make N volumes, and 1/N of the stripes of the N-1 volumes moved to the new volume of the N volumes.

15. The apparatus as in claim 14, further comprising:
    the data container striped across the N volumes so that repetitive access to the data container is distributed among different data storage devices.

16. The apparatus as in claim 14, further comprising:
    a volume location database (VLDB), where an entry in the VLDB keeps track of a selected volume of the N volumes, and the plurality of data storage devices make up the selected volume.

17. The apparatus as in claim 14, further comprising:
    a data access request received by a first computer of the plurality of computers, the request identifying the data container;
    a second computer of the plurality of computers, the second computer to maintain the data container;
    a selected volume of the N volumes to maintain the data of the data container;
    a volume location database (VLDB), where an entry in the VLDB keeps track of the selected volume of the N volumes, and the plurality of data storage devices to make up the selected volume; and
    a selected data storage device, of the plurality of data storage devices that make up the selected volume as indicated by the VLDB, to receive the data access request.

18. The apparatus as in claim 14, further comprising:
    the stripes placed substantially equally among the volumes of the N volumes over which the stripe is placed.

19. The apparatus as in claim 14, further comprising:
    the stripes for different data containers placed across different volumes of the N volumes, and the stripes placed for the different data containers substantially equally among the different volumes of the N volumes over which the stripes are placed.

20. The method as in claim 14, further comprising:
    using a file as the data container.

21. The method as in claim 14, further comprising:
    using a logical unit number as the data container.

22. The apparatus as in claim 14, further comprising:
    the data container striped over the N volumes of data storage devices as a striped volume set (SVS).

23. The apparatus of claim 14, further comprising:
a magnetic disk used as a storage device of the plurality of data storage devices.

24. The apparatus of claim 14, further comprising:
a RAID array of storage disks used as a storage device of the plurality of data storage devices.

25. The apparatus of claim 14, further comprising:
an optical storage device used as a storage device of the plurality of data storage devices.

26. The apparatus of claim 14, further comprising:
an electronic random access memory used as a storage device of the plurality of data storage devices.

27. A computer readable non-transient storage media, comprising:
said computer readable storage media containing instructions for execution on a processor for a method of storing data on a computer data storage system, having,
defining a plurality of nodes, each node having a computer of the computer data storage system to make a plurality of computers;
coupling one or more data storage devices to each computer of the plurality of computers to make a plurality of data storage devices;
implementing a plurality of volumes of data storage on the plurality of data storage devices;
defining a data container to hold data stored by the data storage system;
striping the data container over the plurality of volumes to store the data in the data container in stripes over the plurality of nodes, the plurality of volumes equal to N-1 volumes; and
adding a new volume to the data storage system, to make N volumes, and moving 1/N of the stripes of the N−1 volumes to the new volume of the N volumes.

* * * * *

UNITED STATES PATENT AND TRADEMARK OFFICE
CERTIFICATE OF CORRECTION

| | | |
|---|---|---|
| PATENT NO. | : 8,032,704 B1 | |
| APPLICATION NO. | : 12/533633 | |
| DATED | : October 4, 2011 | |
| INVENTOR(S) | : Peter F. Corbett et al. | |

It is certified that error appears in the above-identified patent and that said Letters Patent is hereby corrected as shown below:

Col. 14, line 27: "an inode file 1006 that contains ~~modes~~inodes of a plurality of files,"

Col. 15, line 11: "tion of management processes that execute as user ~~inode~~mode"

Col. 16, line 3: "user ~~inode~~mode applications 1100."

Signed and Sealed this
Sixth Day of March, 2012

David J. Kappos
*Director of the United States Patent and Trademark Office*